(12) United States Patent
Bopp

(10) Patent No.: US 7,312,814 B2
(45) Date of Patent: Dec. 25, 2007

(54) SYSTEM AND METHOD FOR STORING PATTERN DATA

(75) Inventor: Eric Bopp, Fresno, CA (US)

(73) Assignee: Pelco, Cloris, CA (US)

( * ) Notice: Subject to any disclaimer, the term of this patent is extended or adjusted under 35 U.S.C. 154(b) by 881 days.

(21) Appl. No.: 10/349,376

(22) Filed: Jan. 22, 2003

(65) Prior Publication Data

US 2003/0151662 A1 Aug. 14, 2003

Related U.S. Application Data

(60) Provisional application No. 60/351,340, filed on Jan. 23, 2002.

(51) Int. Cl.
*H04N 7/18* (2006.01)

(52) U.S. Cl. ..................... 348/159; 358/143

(58) Field of Classification Search ......... 348/142–160
See application file for complete search history.

(56) References Cited

U.S. PATENT DOCUMENTS 5,517,236 A * 5/1996 Sergeant et al. ............ 348/143
5,586,231 A * 12/1996 Florent et al. .............. 345/472
5,872,594 A * 2/1999 Thompson ................. 348/211.6
6,421,452 B1 * 7/2002 Matsuura et al. ........... 382/107

* cited by examiner

*Primary Examiner*—Anand Rao
(74) *Attorney, Agent, or Firm*—Paul T. Kashimba

(57) ABSTRACT

A video surveillance system is provided for recording and executing camera operation patterns. Each pattern includes a plurality of records having a camera condition field and a count field. The system reads a camera condition and writes the condition to memory in a pattern record. The system compares each new camera condition with the condition stored in memory, and records a newly read condition into a new pattern record if the new camera condition is different from the condition data stored in the most recent pattern record. Otherwise, the count field is updated in the most recent pattern record by incrementing a count data therein. Patterns are executed by sequentially moving the camera through the camera condition stored in the pattern records, and keeping the system at a particular condition for a duration equal to the count data of each pattern record multiplied by a predetermined time interval.

10 Claims, 4 Drawing Sheets

SYSTEM AND METHOD FOR STORING PATTERN DATA

CROSS-REFERENCE TO RELATED APPLICATION

This application is related to and claims priority to U.S. Provisional Patent Application Ser. No. 60/351,340, filed Jan. 23, 2002, entitled SYSTEM AND METHOD FOR STORING PATTERN DATA, the entirety of which is incorporated herein by reference.

STATEMENT REGARDING FEDERALLY SPONSORED RESEARCH OR DEVELOPMENT n/a

FIELD OF THE INVENTION

The present invention relates to video systems, and, in particular, to a system and method for processing video signals and storing pattern data for fields of view in remote-controlled video surveillance systems.

BACKGROUND OF THE INVENTION

In the operation of remote controlled video surveillance camera systems, it is desirable to be able to store patterns of camera operational parameters, such as position and movement data, for future recall and playback. A pattern can include simply moving from side to side in one axis (panning) or can include a series of more complicated movements, area scans, preprogrammed sweeps and other sequences of operational characteristics. For example, a pattern may constitute moving a camera from one point having a first X and Y coordinate to another point having a different X and Y coordinate, where the path that the camera takes from the first coordinate to the second coordinate may be comprised of any combination of side to side (panning) movements and/or up and down (tilting) movements.

Storing pattern data requires a significant memory capacity that many systems, especially portable stand-alone video surveillance systems, do not possess. Furthermore, the known systems and methods of pattern storage relied on the occurrence of multiple repetitions of record entries, whereby the same camera operation parameters were stored in successive records pattern data. This is often the case when a camera is oriented towards a particular field of view, is set to a particular zoom or iris setting, and then does not charge its state for significant periods of time. However, an automated recording of the operational status such as pan position, tilt position, zoom, iris and/or focus settings of the camera system is stored as a pattern, wherein a record of the status is stored at regular time intervals. Thus for many time intervals, the system records the same pattern status for the camera.

For example, the known systems and methods for storing a pattern are accomplished by sending a record of the position data of either the control device, such as a joystick or keyboard, or the actual position of the camera to a memory storage device every 1/60 of a second. By this method, a recording of the position data is made which contains 60 entries per second. For example, when storing the data from a joystick, the vector of the joystick is stored in the memory storage device, when the pattern is played back, the data is interpreted by a micro-controller which controls the camera movement as if it was being received from the joystick, and the previously stored pattern is thereby duplicated.

As stated above, a disadvantage encountered in these methods is that if the pattern data does not change during an extended period of time, excessively repetitive consecutive records are entered into the memory storage device. This in turn uses a large amount of available memory. It is therefore desirable to have a system and method for streamlining and compressing the storage of pattern data in a remote controlled video surveillance camera system.

SUMMARY OF THE INVENTION

According to one aspect, the present invention provides a method of video surveillance using a camera having a memory storing one or more pattern data sets, each pattern data set includes one or more pattern records and each pattern record has one or more camera condition fields and a count field. The camera moves through a first plurality of camera conditions. A first camera condition data is stored in a first pattern record. A second camera condition data is read. The second camera condition data is compared with the first camera condition data. The count field of the first pattern record is incremented if the second camera condition data matches the first camera condition data. The second camera condition data is stored in a new pattern record if the second camera condition data does not match the first camera condition data.

According to another aspect, the present invention provides a method of recording and storing camera scan patterns in an active video surveillance system executing a plurality of camera conditions in which each pattern includes one or more pattern records and each pattern record has a camera condition data and a count data. A first camera condition data corresponding to a first camera condition in a first pattern record is stored. A second camera condition data corresponding to a second camera condition is read. The second camera condition data is compared with the first camera condition data. The count data of the first pattern record is incremented if the second camera condition data is identical to the first camera condition data. The second camera condition data is stored in a new pattern record if the second camera condition data is not identical to the first camera condition data.

According to still another aspect, the present invention provides a method of video surveillance using a camera having a memory storing one or more pattern data sets in which each pattern data set includes one or more pattern records and each pattern record has a camera condition field and a count field. A first pattern record is selected from a first pattern data set. A first camera condition data from the camera condition field of first pattern record is read. The first camera condition data includes a first set of camera commands corresponding to a first camera condition. A first count data is read from the count field of the first pattern record. The camera is moved in accordance with the first camera condition for a duration equal to the first count data multiplied by a predetermined pattern time interval.

According to still yet another aspect, the present invention provides a video surveillance system in which a memory stores one or more pattern records. Each pattern record includes a camera condition field and a count field, and each camera condition field has a camera command data corresponding to a camera condition. A processor is electrically coupled to the memory and reads a plurality of camera conditions at predetermined time intervals.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As used herein, a "pattern" or "pattern data" shall refer to a series of operational parameters of a camera, such as pan position, tilt position, camera zoom setting, iris setting, exposure time, horizontal position (in reference to display coordinates), vertical position (in reference to display coordinates), and/or any other relevant parameter which describes the status or condition of a camera. Each pattern or pattern data includes a series of pattern records. Each record is in turn made up of one or more fields, or data subdivisions. Each or several groupings of operational parameters may be allocated or stored in one field. Additional fields may be included in the pattern record as described below.

Also as used herein, the term "memory" or "memory area" means a single or multiple physical memory element, or a portion of a single physical memory element. A "memory element" is in turn used herein to define any device capable of storing digital information.

Figure 1:
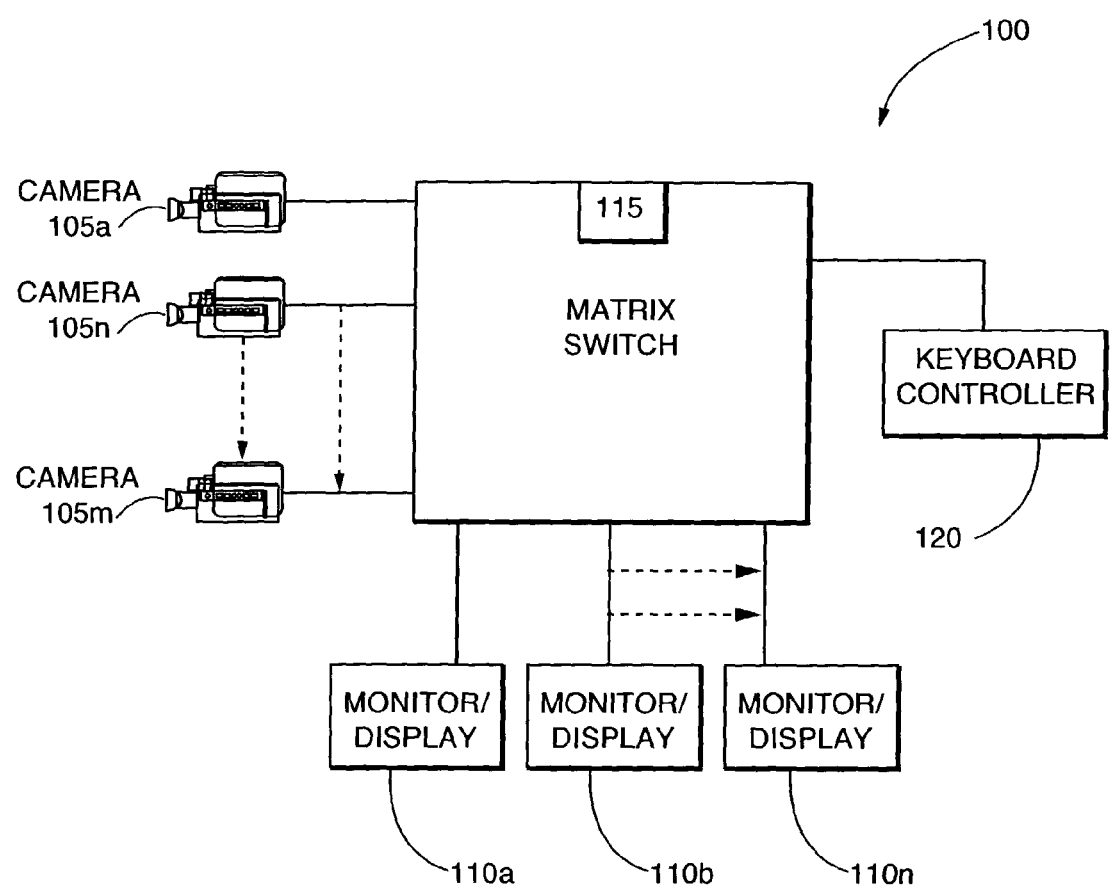
FIG. 1 is a block diagram of an exemplary multi-camera video surveillance system arranged in accordance with the principles of the present invention

Referring now to the drawing figures, in which like reference designators refer to like elements, there is shown in FIG. 1 a block diagram of a video surveillance system, such as a closed circuit television (CCTV) system, for use in monitoring multiple scenes from multiple locations, constructed in accordance with the principles of the present invention and designated generally as 100. System 100 includes up to "m" video cameras 105a, 105b, through 105m, along with up to "n" video monitors or displays 110a, 110b, through 110n, (where "m" and "n" are whole numbers) coupled to a video switch, having at least one keyboard controller 120 connected thereto.

The cameras 105 may be any of a variety of video or still cameras, acquiring a picture using a lens, iris, zoom and focus controls, integrated optics package, or other image acquisition device. The cameras 105 may be included inside of a housing such a semi-hemispherical dome, suitable for affixation onto a surface. The housing may also include a set of orientational controls, such as pan and tilt motors and actuators for moving and orienting the direction of the image acquisition device. An example of such a camera 105 and housing is the SPECTRA series of video surveillance units manufactured by Pelco.

Each camera 105 is connected to the video switch 115, such as a multi-input and output "matrix" switch. The switch 115 contains a variety of components, including a microcontroller and control circuit electronics for controlling the operation of each camera 105, through commands and codes received by the keyboard controller 120. Both the cameras 105 and keyboard controller 120 may be disposed at remote locations from the switch 115. The switch 115 is further connected to a number "n" of monitor displays 110. The "matrix" therefore, contains m×n channels for m camera inputs and n monitor outputs. One example of such a matrix switch is the CM 6800 switch manufactured by Pelco, which provides m=48 and n=8. The keyboard controller 120 is further used to control the appearance of the video signals on the monitors 110, such as the overall brightness, contrast, and the nature of the display of character text onto the images acquired by the cameras 105, as more fully described below.

Figure 2:
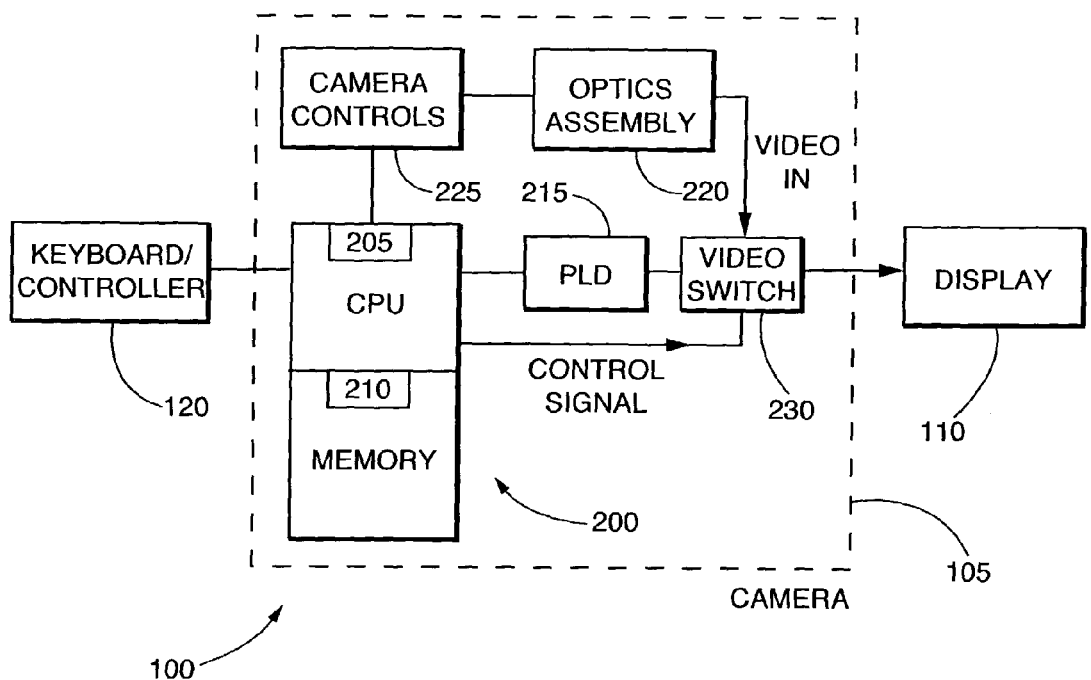
FIG. 2 is a block diagram of a camera assembly connected to a controller and display unit, showing the primary components of the camera's image acquisition and processing architecture.

FIG. 2 is a block diagram of a single camera assembly 105 connected to a controller 120 and display unit 110, showing the primary components of the camera's image acquisition and processing architecture. Camera 105 includes a microcontroller or computer 200, which further includes a microprocessor element or CPU 205 and a memory element 210, and may also include one or more separate programmable logic devices (PLDs) 215 coupled to the microcontroller 200. Camera 105 further includes an optics assembly 220 which includes a number of image acquisition components, such as a lens assembly, an iris, an imaging array, etc. Optics assembly 220 is further controlled by a set of mechanical camera controls 225, such as pan and tilt motors, or other suitable electromechanical components used for moving the optics assembly 220 over multiple degrees of freedom. Further included is a video switch 230 which receives the video signal output from the optics assembly 220 and either multiplexes or switches the signal with any one of a number of different control signals generated by the microcontroller 200. The switch 230 may be controlled by logic generated by the microcontroller 200 itself or by a separate PLD 215 interposed therebetween, or by a combination of both elements. The output from the video switch 230 is displayed on the display unit 110 such as via a matrix switch 115 (not shown in FIG. 2).

CPU 205 may be any processing device or chip, microprocessor or microcontroller. An exemplary micro-controller is a 32-bit MCORE MMC2107 manufactured by Motorola. Memory 210 may be volatile or non-volatile, and include one or more memory elements, such as an electronically erasable programmable read-only memory (EEPROM), a random access memory (RAM), a flash memory, or a magnetic or optical memory drive. The memory element 210 may be further subdivided into a number of databases for holding data, and for storing programmatic software, configuration data, and other logic used by the microcontroller 200, the PLD 215, the camera controls 225, optics assembly 220, video switch 230, or the entirety of the camera system 100. The PLD 215 may be any integrated circuit programmed to perform complex functions, and may include a programmable read-only memory (PROM), a programmable logic array (PLA), or programmable array logic/generic array logic (PAL/GAL). Examples of the PLD 215 implemented in one embodiment of the invention include any of the suitable devices manufactured by Altera Corporation.

The microcontroller 200 receives inputs and commands from a user operating the keyboard/controller 120 external to the camera assembly 105. The keyboard/controller 120 further includes a joystick or other manual device suitable for instructing the movement of the camera optics and motors to pan, tilt, zoom, and control the iris settings of the camera. All of these commands are processed by the microcontroller 200 inside the camera, with some external processing or preprocessing in the keyboard/controller 120 itself. Although not described herein, it is contemplated that one of ordinary skill in the art understands that keyboard/controller 120 generally generates signals to control other aspects of camera control/movement not listed herein. A software routine running on the microcontroller 200 controls the operation of the camera as well as the appearance of the video signal on the display 110, through the logic and commands generated by the microcontroller 200 and PLD 215. For purposes of description, this software, which may include a number of varying routines and subroutines, shall be denoted generally as the "camera software" and shall refer to any of the logic and commands executed by the microcontroller 200 as processed by the CPU 205 and using data, programming and instructions stored or entered in the memory 210. One particular function of the camera software is to store and execute patterns of movement and operational parameters for the camera 105, manipulated by a user with keyboard/controller 120.

The present invention is a system and method of video surveillance using a camera system and architecture such as that illustrated in FIGS. 1 and 2 and described above. The camera captures an image of a scene and produces a video signal, which is routed to the display unit 110 and is rendered on a monitor or any other suitable display device. Each image displayed on display unit 110 is a function of the particular camera settings, such as the orientation of the camera (its particular pan and tilt setting), the magnification or width of view (its particular zoom setting), and the extent of view (its particular iris setting). Additional operational parameters would be necessary for translating camera systems, but this invention is nominally concerned with fixed camera systems, such as dome cameras, which have two or more rotational degrees of freedom. However, it is readily understood that the principles of the present invention cover both fixed and translating camera systems.

Figure 3:
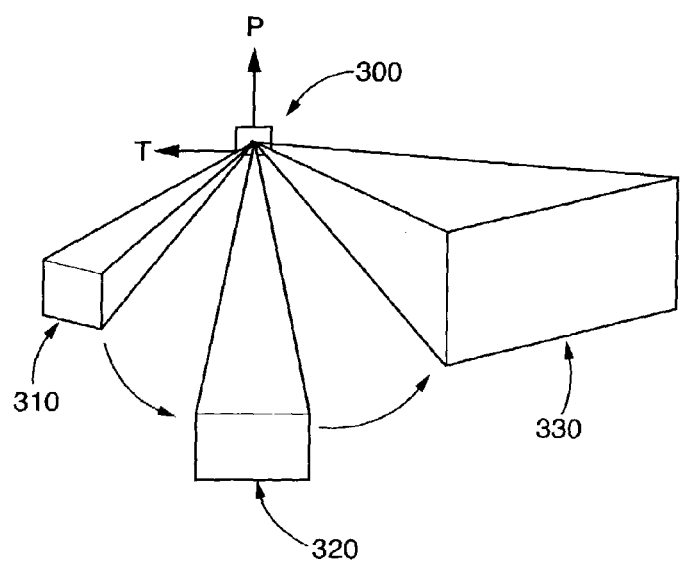
FIG. 3 is a schematic diagram of a camera pattern, showing first, second, and third views of a fixed camera as it executes the pattern.

FIG. 3 is a schematic diagram of a camera pattern, showing first, second, and third views of a fixed camera as it executes the pattern. A pattern is generally used to describe a series of camera movements and lens adjustments, to cover a particular field of view over a particular time during video surveillance. However, as stated above, a pattern may be any series of operational parameters of a camera, where any one operational parameter is varied in time. FIG. 3 illustrates a fixed camera 300 cycling through three successive fields of view: a first view 310, a second view 320, and a third view 330. As shown in FIG. 3, the second view 320 has been rotated about a pan axis P as shown, as well as a tilt axis T as shown, relative the first view 310 (or to a fixed absolute P-T reference frame as shown). The third view 330 is yet another different pan and tilt position for the camera. Thus, the particular pattern shown in FIG. 3 includes a series of pan and tilt movements.

The pan and tilt movements also may also include changes in the zoom or magnification, as shown by the successively wider fields of view in successive views 310, 320 and 330. The pattern may also include the focus and/or iris data for each field of view, in addition to one or more of pan and tilt speeds, for panning and tilting movements, respectively.

Pattern data includes a number of successive pattern records in which one or more of the foregoing camera parameters are stored. Each pattern record includes a number of fields into which the camera parameters are entered, and from which the camera controller 200 may interpret to control the camera. A field may be a single bit, a number of bits, a byte or more.

In one embodiment of the present invention, a single pattern record includes five bytes. Four bytes are used to store camera parameters, while another fifth byte is used as a "count" byte. The organization of the bytes may be as follows:

| | |
|---|---|
| Byte 1: | Command 1 |
| Byte 2: | Command 2 |
| Byte 3: | Data 1 |
| Byte 4: | Data 2 |
| Byte 5: | Count |

Each of Bytes 1 and 2 may include a basic standard command set for the camera. An example of such a command set, and the allocation of commands to particular bits within Bytes 1 and 2, may be as follows:

| STANDARD COMMAND SET | | | | | | | | |
|---|---|---|---|---|---|---|---|---|
| | Bit 7 | Bit 6 | Bit 5 | Bit 4 | Bit 3 | Bit 2 | Bit 1 | Bit 0 |
| Command 1 | Sense | Reserved | Reserved | Auto/Manual Scan | Camera On/Off | Iris Close | Iris Open | Focus Near |
| Command 2 | Focus Far | Zoom Wide | Zoom Tele | Up | Down | Left | Right | Standard (OFF)/Extended (ON) |

The sense bit (Command 1 byte, Bit 7) indicates the meaning of Bits 4 and 3 of Command 1. If the sense bit is on, and Bits 4 and 3 of Command 1 are on, the command will enable auto-scan and turn the camera on. An auto-scan is a general term related to automatic operation of the camera, without manual control from an external controller. If the sense bit is off and Bits 4 and 3 of Command 1 are on the command will enable manual scan and turn the camera's automatic mode controls off. Of course, if either Bits 4 and 3 of Command 1 are off then no action will be taken for those features.

The reserved bits (Bits 6 and 5 of Command 1) are set to 0 in this example, and may be used for additional commands as the case may be.

The data reserved for byte 3 corresponds to the pan speed. Pan speed data is in the range 0x00 (stop) to 0x3F (high speed) and 0x40 for "turbo" speed. (Please note that values cited herein prefixed with "0x" are hexadecimal numbers.) Turbo speed is the maximum speed the camera device can obtain and is considered separately because it is not generally a smooth step from high speed to turbo. That is, going from one speed to the next usually appears smooth and will provide for smooth motion with the exception of going into and out of turbo speed.

The data reserved for byte 4 corresponds to the tilt speed. Tilt speed data is in the range 0x00 (stop) to 0x3F (maximum speed).

In addition to the general Pan-Tilt-Zoom ("PTZ") commands shown above, there are control commands that allow access to the more advanced features of the video surveillance system of the present invention. An example of such extended commands are as follows:

| EXTENDED COMMAND SET | | | | |
| --- | --- | --- | --- | --- |
| Command | Byte 1 | Byte 2 | Byte 3 | Byte 4 |
| Go to a Preset | 00 | 0x07 | 00 | Preset ID # |
| Flip 180 degrees | 00 | 0x07 | 00 | 0x21 |

Byte 2 can be thought of as the command's "opcode." Note that Extended commands are differentiated from Standard commands by extended commands always having bit 0 of byte 2 on.

Each of Bytes 1 through 4 are discussed herein is camera "condition" fields within a pattern record, describing the state or condition of the operating parameters of the camera and video surveillance system. As used herein, a "condition" may be any operating parameter of the camera, including, without limitation, pan or tilt position or speed, zoom or focus setting, iris setting, manual/automatic mode setting, preset commands, flip commands, any one of the standard or extended commands that may be used to control the camera or the video surveillance system. It is these camera condition fields that are stored in a pattern record, and, along with the amalgamation of successive pattern records stored over time, in the overall pattern data stored in memory 210.

In addition to each of the camera condition fields, one other "count field" or count byte, is stored in each pattern record. The count byte stores a count integer between 0 and 255, and is incremented by one each time the camera condition fields of a new pattern record stored in a pattern data is the same as in the previous record stored. A more detailed description of this process is explained below.

Figure 4:
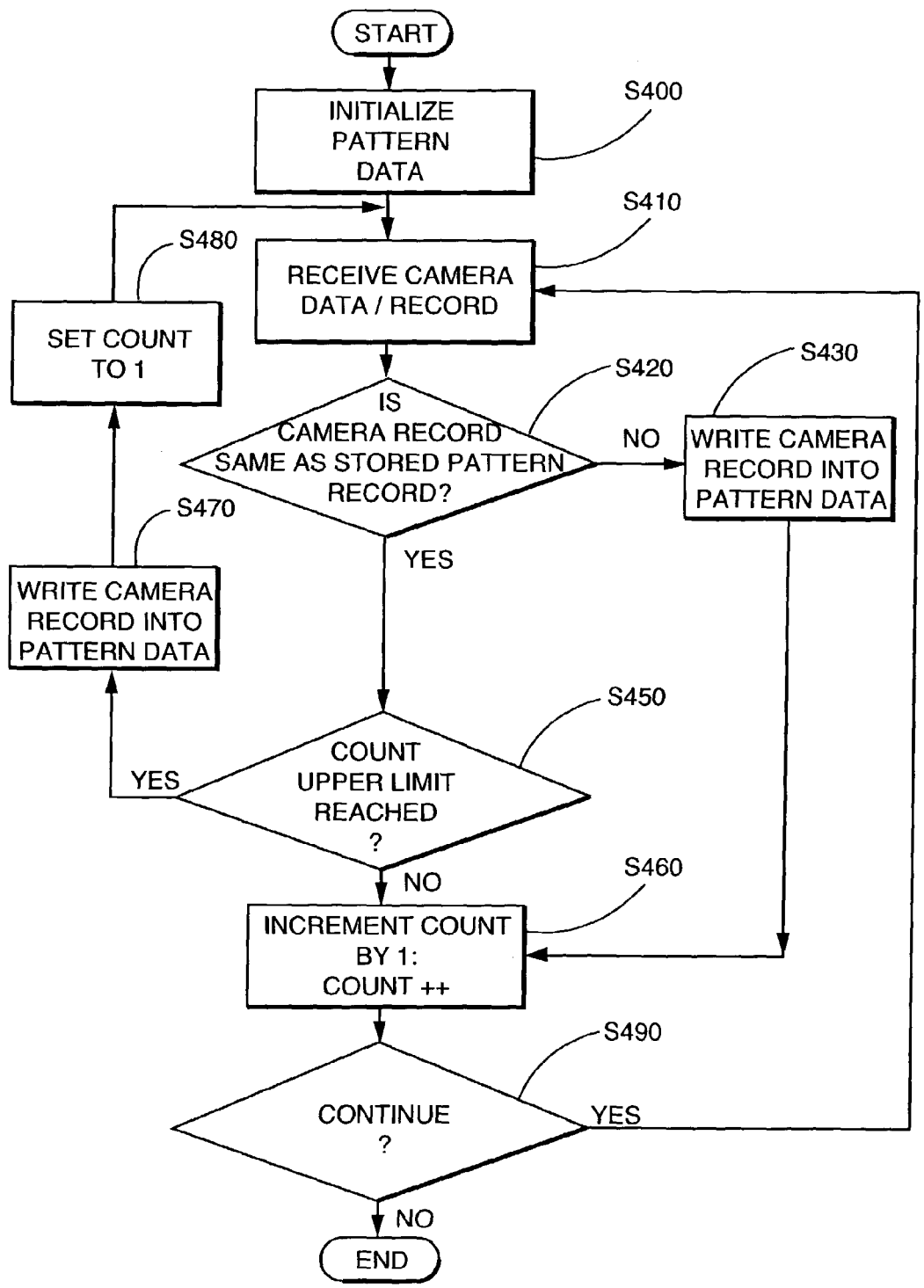
FIG. 4 is a flowchart illustrating the process by which a camera pattern is stored.

FIG. 4 is a flowchart illustrating the process by which a camera pattern is stored. In step S400 the process begins by initializing the pattern data stored in memory 210, including setting the initial pattern record's camera condition fields (Bytes 1 through 4) to a nominal value, such as the current condition of the camera such as zoom, focus, and/or iris and the pan/tilt location in an initialization record. As is shown in FIG. 4, this initialization record is not included as part of records including the count data. The count field (Byte 5) of the initial pattern record is reset to zero.

In step S410, the processor 200 receives data on the camera condition after a predetermined time interval or "pattern time interval" (PTI) which is programmed into the processor 200 to measure and receive such camera condition data at a frequency equal to 1/PTI. The pattern time interval may be any suitable time interval selected to separate the individual pattern records in a pattern data. An exemplary pattern time interval is $\frac{1}{60}^{th}$ of a second. However, any time interval can be used based on the designer's preferences and the capabilities and memory size of the system. In step 410, the processor receives data related to all camera conditions reflected in each of Bytes 1 and 4 as explained above.

In step S420, the processor 200 compares the newly received camera condition bytes with the camera condition bytes stored in the most recently stored pattern record (which, in the case of a new pattern data set, is the initialized pattern record stored in step S400). If any camera condition reflected and stored in any of the camera condition bits in Bytes 1 through 4 are different in any way from those camera condition bytes stored in the most recent pattern record, then the process proceeds to step S430, wherein a new camera record is created and stored in memory 210. This new pattern record is thus stored as the new "most recent" pattern record, having one or more different bits in the camera condition Bytes 1 through 4, and a count field or COUNT byte reset to zero. The process then proceeds to immediately increment and set the count field or COUNT byte to an initial value of 1 in step S460, reflecting the fact that the camera condition stored in such new pattern record in present in the pattern data at least once.

If, however, going back to step S420, the new camera condition fields are the same as those stored in the most recent pattern record, then the pattern data storage process goes to step S450. At step S450, the processor 200 examines whether or not the COUNT byte has reached its upper limit, e.g., whether the COUNT value has reached 255 (or 0xFF). If the COUNT byte has not reached its upper limit, the process proceeds to step S460, wherein the processor 200 increments the COUNT byte by 1 in the COUNT field of the most recent pattern record. Thus the most recent pattern record is now stored in memory 210, having unchanged camera condition bytes (Bytes 1 through 4), and a newly increments COUNT byte (Byte 5).

If, on the other hand, the COUNT byte has reached its upper limit, the process then proceeds to step S470 in which the pattern data is incremented with a new pattern record, containing the same camera condition bytes (Bytes 1 through 4) as the previous pattern record, but with a COUNT byte set at the upper limit, e.g. 255 (0xFF) for the previous pattern record. Thus the new most recent pattern record is now stored in memory 210 with processor 200, having unchanged camera condition bytes (Bytes 1 through 4) from the previous pattern record (which has a maximum COUNT byte value), and a newly set COUNT byte (Byte 5) (step S480) equal to "1". The process then proceeds to step S410.

At step S490, the processor 200 determines whether or not the pattern data storage process should continue, based on predetermined or preprogrammed criteria, or based on a command and user inputs received from the keyboard/controller 120. If the pattern data storage is to continue, the process proceeds back to step S410, wherein, after a pattern time interval, the pattern data is once again received by the processor for storage. If no continuation is required, the process ends. It will be noted that the camera 100 may be moving or changing conditions anytime, or between steps S490 and S410. The processor 200 may set a predetermined cycle of processes S410 to S490 to run at a given frequency. This frequency, as stated above may be equal to 1/PTI. Or, the frequency may be irregular, at a preprogrammed rate, such that camera conditions are read and pattern records are stored, in a series of time-non-linear intervals. The algorithm for the time-non-linear intervals can be preprogrammed or the time interval can be stored as part of the pattern record (not shown).

Figure 5:
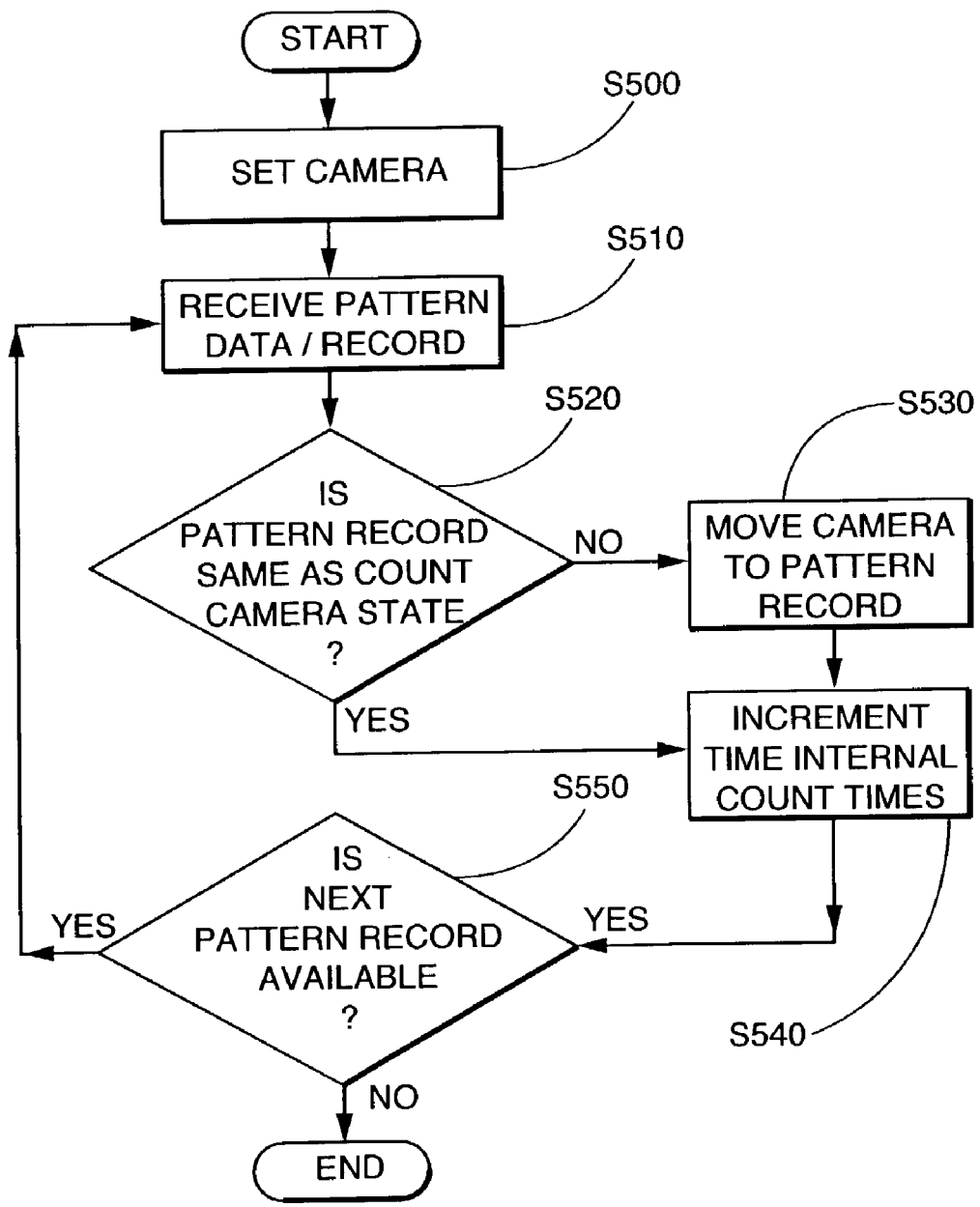
FIG. 5 is a flowchart illustrating the process by which a camera pattern is executed.

Patterns stored by the process described in FIG. 4 may be executed thereafter by the camera 100 as part of a pattern scan. FIG. 5 is a flowchart illustrating the process by which a camera pattern is executed. The process commences at step S500 where the camera 100 is set to execute a pattern. One or multiple patterns may be selected from memory 210. The current state or condition of the camera and video surveillance system is also assessed and stored in memory for later comparison. As part of step S500, the initialization record for the selected pattern, as set in step S400 above is read from memory 210 and the camera parameters such as focus, zoom and/or iris are set and the camera is moved to the starting pan/tilt location Next, processor 200 receives the first pattern record of the selected pattern data in step S510. In step S520, the processor 200 causes the camera to move and/or adjust zoom, focus and/or iris settings in accordance with the pattern data record. Upon expiration of the PTI, the COUNT for the retrieved pattern data record is decremented (step S530). If the COUNT is not zero in step S540, the process returns to step S530. This arrangement effectively and efficiently causes the camera to use the single pattern record for a period equal to COUNT*PTI.

If the COUNT equals zero in step S540, processing is complete for that pattern record, the process proceeds to step S550, to determine if another pattern record is available in the pattern data. If another pattern record is available, the process returns to step S510, and reads the next serially stored pattern record in the pattern data set. If no additional records are available in the pattern data, then the pattern scan is finished and the process ends. The camera may then be commanded to select a new pattern scan from another pattern data set, wherein upon the entire process may start again.

In this manner, pattern scans contain far less aggregate data than used in previously known devices. The present invention therefore provides a system and method of pattern data compression, including the recording and storing of compressed pattern record data, the execution and playback of compressed pattern data, and so forth. Depending on the nature of the pattern and the number of changes in camera conditions for a given pattern, the memory savings achieved by the present invention may be on the order of a compression ratio of 100 times or more.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of video surveillance comprising the steps of: initializing a camera; receiving a first camera condition data; storing the first camera condition data in a first pattern record; storing a count field in the first pattern record; receiving a second camera condition data; comparing the second camera condition data with the first camera condition data; storing the second camera condition data in a new pattern record if the second camera condition data does not match the first camera condition data; discarding the second camera condition data and incrementing the count field in the first pattern record if the second camera condition data matches the first camera condition data thereby reducing the number of pattern records stored; retrieving the first pattern record; controlling the camera in response to the first pattern record; and using the count field in the first pattern record to determine if the next pattern record should be retrieved.

2. The video surveillance method of claim 1, further comprising writing the new pattern record to memory.

3. The video surveillance method of claim 1, wherein the first plurality of camera conditions includes at least a first camera condition and a second camera condition, and the first camera condition data corresponding to the first camera condition, and the second camera condition data corresponding to the second camera condition data.

4. The video surveillance method of claim 1, further comprising: receiving the first camera condition data at a first point in time; and receiving the second camera condition data at a second point in time; the second point in time being one predetermined time interval after the first point in time.

5. The video surveillance method of claim 4, wherein the predetermined time interval is one sixtieth of a second.

6. The surveillance method of claim 1, further comprising resetting the count field of the new pattern record to an initial value.

7. The video surveillance method of claim 1, further comprising comparing the count field of the first pattern record to an upper limit value; storing the upper limit value as the count field of the first pattern record if the compared count field equals the upper limit value; and resetting the count field of the new pattern record to an initial value.

8. The video surveillance method of claim 1, wherein the one or more camera condition fields of each pattern record include one or more data command selected from the group consisting of a tilt data command, a pan data command, a tilt speed data command, a pan speed data command, a zoom data command, a focus data command, and automatic scan data command, a manual scan data command, and an iris data command.

9. The video surveillance method of claim 1, wherein the one or more camera condition fields of each pattern record include a set of data command including a tilt data command, a pan data command, a tilt speed data command, a pan speed data command, a zoom data command, a focus data command, an automatic scan data command, a manual scan data command, and an iris data command.

10. A video surveillance camera comprising a memory and processor connected to said memory, said processor adapted to receive camera condition data and programmed to receive a first camera condition data, to store the first camera condition data in a first pattern record in said memory, to store a count field in the first pattern record, to receive a second camera condition data, to compare the second camera condition data with the first camera condition, to store the second camera condition data in a new pattern record in said memory if the second camera condition data does not match the first camera condition data, to discard the second camera condition data and increment the count field in the first pattern record if the second camera condition data matches the first camera condition data thereby reducing the number of pattern records stored, to retrieve the first pattern record from said memory, to control the camera in response to the first pattern record, and to use the count field in the first pattern record to determine if the next pattern record should be retrieved from said memory.

* * * * *